United States Patent
Paing et al.

(10) Patent No.: US 8,109,373 B2
(45) Date of Patent: Feb. 7, 2012

(54) PUMPING DEVICE AND HEIGHT ADJUSTER FOR VEHICLE SEAT

(75) Inventors: Hyun-Sung Paing, Incheon (KR); Heon-Pil Lim, Incheon (KR)

(73) Assignee: Austem Co., Ltd., Cheonan-si (KR)

( * ) Notice: Subject to any disclaimer, the term of this patent is extended or adjusted under 35 U.S.C. 154(b) by 727 days.

(21) Appl. No.: 12/300,453

(22) PCT Filed: Feb. 2, 2007

(86) PCT No.: PCT/KR2007/000582
§ 371 (c)(1), (2), (4) Date: Nov. 11, 2008

(87) PCT Pub. No.: WO2007/111414

PCT Pub. Date: Oct. 4, 2007

(65) Prior Publication Data
US 2009/0184554 A1 Jul. 23, 2009

(30) Foreign Application Priority Data

Mar. 24, 2006 (KR) .................. 10-2006-0026767
Nov. 22, 2006 (KR) .................. 10-2006-0115835

(51) Int. Cl.
*B60N 2/16* (2006.01)
(52) U.S. Cl. .................. 192/15; 192/19; 297/344.12
(58) Field of Classification Search .............. 192/15, 192/19, 223.2, 43.2
See application file for complete search history.

(56) References Cited

U.S. PATENT DOCUMENTS

| 6,032,777 | A | 3/2000 | Denis |
| 6,230,867 | B1 * | 5/2001 | Schwarzbich ............... 192/15 |
| 6,481,557 | B2 * | 11/2002 | Denis ........................ 192/15 |
| 6,616,241 | B1 | 9/2003 | Masuda et al. |
| 6,640,952 | B2 * | 11/2003 | Baloche et al. ............ 192/15 |
| 2005/0006193 | A1 | 1/2005 | Kim |
| 2005/0056518 | A1 * | 3/2005 | Weber ..................... 192/223.1 |

FOREIGN PATENT DOCUMENTS
JP 10234507 9/1998
KR 100457396 11/2004

OTHER PUBLICATIONS

PCT/KR2007/000582 International Search Report dated May 8, 2007.

* cited by examiner

*Primary Examiner* — Rodney Bonck
(74) *Attorney, Agent, or Firm* — Schmeiser Olsen & Watts LLP (57) ABSTRACT

A pumping device and a height adjuster for a vehicle seat are disclosed. The pumping device comprises a support plate; a cam receiver accommodated in the support plate; a brake cam received in the cam receiver to be integrally rotated with the shaft, and defining receiving spaces between the brake cam and the cam receiver; locking means received in each receiving space to allow and prevent rotation of the brake cam in the cam receiver; a control plate for applying the pushing force to the locking means; a bidirectional clutch coupled to the control plate if rotating force is applied and returned to a state of being decoupled from the control plate if the rotating force is not applied; a cover plate assembled with the support plate; a lever plate provided outside the cover plate; and elastic returning means for returning the lever plate to a predetermined reference position.

15 Claims, 7 Drawing Sheets

PUMPING DEVICE AND HEIGHT ADJUSTER FOR VEHICLE SEAT

TECHNICAL FIELD

The present invention relates to a pumping device and a height adjuster for a vehicle seat having the same, and more particularly, to a pumping device which adopts a lever operation structure using a bidirectional clutch so as to improve the efficiency of use of space and ensure operational convenience, and a height adjuster for a vehicle seat having the same.

BACKGROUND ART

In the present specification, a pumping device is a mechanism which is used in a vehicle seat or the like to rotate, lock and unlock a shaft so that the rotation amount of the shaft can be adjusted and maintained.

Such a pumping device can be applied to the input side of a height adjuster for a vehicle seat, as disclosed in Korean Patent No. 457,396, entitled "Seat Height Adjuster Apparatus for Vehicle" or U.S. Pat. No. 6,032,777 entitled "Locking Device, in Particular For a Motor Vehicle Seat", or can be applied to a recliner for rotating a seatback, as disclosed in U.S. Pat. No. 6,616,241 entitled "Rotation Limiting Device and Seat Recliner Device Using the Same".

However, in the conventional pumping device, since a knob is used as the input means for adjusting the rotation amount of the shaft, when mounting the pumping device to a seat, sufficient space must be secured to allow the manual operation of the pumping device, and since a considerable amount of force is required to operate the pumping device, it is difficult for an old or feeble person to manipulate the pumping device.

DISCLOSURE OF INVENTION

Technical Problem

Accordingly, the present invention has been made in an effort to solve the problems occurring in the related art, and an object of the present invention is to provide a pumping device which requires minimal operation space and can be easily operated with reduced force, and to a height adjuster for a vehicle seat having the same.

Technical Solution

In order to achieve the above object, according to one aspect of the present invention, there is provided a pumping device for controlling the rotation and locking of a shaft, comprising a support plate having a hole through which the shaft passes; a ring-shaped cam receiver accommodated in the support plate to be supported; a brake cam received in the cam receiver to be integrally rotated with the shaft, and defining a plurality of receiving spaces between the brake cam and the inner circumferential surface of the cam receiver at regular intervals in a circumferential direction; locking means received in each receiving space to allow and prevent rotation of the brake cam in the cam receiver depending upon whether or not pushing force is applied to the locking means in the circumferential direction; a control plate for applying the pushing force to the locking means in the circumferential direction through rotation thereof; a bidirectional clutch held in a state of being coupled to the control plate if clockwise or counterclockwise rotating force is applied thereto, and returned to a state of being decoupled from the control plate if the rotating force is not applied thereto; a cover plate assembled with the support plate so that the cam receiver, the brake cam, the locking means, the control plate, and the bidirectional clutch are received in a space defined between the support plate and the cover plate; a lever plate provided outside the cover plate, having a hole through which the shaft passes, and applying the clockwise or counterclockwise rotating force to the bidirectional clutch; and elastic returning means for returning the lever plate to a predetermined reference position.

According to another aspect of the present invention, the bidirectional clutch includes a clutch cam which rotates about the shaft upon application of the rotating force from the lever plate, a locking gear slid by the rotating clutch cam from a decoupled position, in which the locking gear is decoupled from the control plate, to a coupled position, in which the locking gear is coupled to the control plate, and elastic pressing means for pressing the locking gear toward the decoupled position; and the control plate is formed with teeth to be coupled with the locking gear.

According to another aspect of the present invention, the locking gear is provided in a plural number to be selectively slid depending upon the rotating direction of the clutch cam.

According to another aspect of the present invention, the bidirectional clutch further includes a guide plate which has a guiding part for guiding the sliding movement of the locking gear and a supporting part for supporting the elastic pressing means.

According to another aspect of the present invention, the clutch cam further includes a rotation column which projects from the clutch cam and has one end coupled to the lever plate to receive the rotating force from the lever plate; and the guide plate has a guide slot through which the rotation column passes so that the rotation angle thereof is limited in a rotation angle thereof.

According to another aspect of the present invention, the clutch cam further includes a rotation column which projects from the clutch cam and has one end coupled to the lever plate to receive the rotating force from the lever plate; and the cover plate has a plurality of stoppers formed thereon which limit the rotation angle of the rotation column so as to prevent the lever plate from being rotated beyond a pred etermined angle from the reference position in each rotating direction thereof.

According to another aspect of the present invention, the brake cam has linear surface parts which define the receiving spaces in cooperation with the inner circumferential surface of the cam receiver, and partitioning parts which are brought into contact with the inner circumferential surface of the cam receiver to partition the receiving spaces from one another; the locking means includes a plurality of rollers received in each space, and elastic means interposed between the rollers to press the rollers toward both ends of the receiving space; and the control plate has control projections which are interposed between the rollers of the locking means and the partition parts of the brake cam so as to push the rollers toward center portions of the receiving spaces if the control plate is rotated.

According to another aspect of the present invention, there is provided a pumping device for controlling rotation and locking of a shaft, comprising a support plate having a hole for passage of the shaft and a ring-shaped cam receiving part formed around the hole; a brake cam received in the cam receiving part of the support plate to be integrally rotated with the shaft, and having a plurality of receiving spaces between the brake cam and the inner circumferential surface of the cam receiving part at regular intervals in a circumferential direction; locking means received in each receiving space to allow and prevent rotation of the brake cam in the cam receiving part depending upon whether or not pushing force is applied to the locking means in the circumferential direction; a control plate for applying the pushing force to the locking means in the circumferential direction through rotation thereof; a bidirectional clutch held in a state of being coupled to the control plate if clockwise or counterclockwise rotating force is applied thereto, and returned to a state of being decoupled from the control plate if the rotating force is not applied thereto; a hinge lever having a hole for passage of the shaft, and applying the rotating force to the bidirectional clutch while being rotated about the shaft; a cover plate assembled with the support plate so that the brake cam, the locking means, the control plate, the bidirectional clutch, and the hinge lever are received in a space defined between the support plate and the cover plate; and elastic returning means for returning the hinge lever to a predetermined reference position.

According to another aspect of the present invention, the bidirectional clutch includes a locking gear that slides between a coupled position, in which the locking gear is coupled to the control plate, and a decoupled position, in which the locking gear is decoupled from the control plate, depending upon whether or not the rotating force is applied from the hinge lever to the locking gear, and a guide plate rotatably coupled to the shaft to guide the sliding movement of the locking gear; and the control plate is formed with teeth to be coupled with the locking gear.

According to another aspect of the present invention, the locking gear has a plurality of teeth parts to be selectively coupled to the control plate depending upon the direction in which the rotating force is applied by the hinge lever.

According to another aspect of the present invention, the locking gear has a sliding projection; the guide plate has a guide slot through which the sliding projection passes so that the sliding range of the sliding projection can be limited by the guide slot; and the hinge lever has a projection guide part which controls the position of the sliding projection in the guide slot when the hinge lever is rotated.

According to another aspect of the present invention, the cover plate has an opening for allowing the hinge lever to be directly rotated from the outside.

According to still another aspect of the present invention, the brake cam has linear surface parts which form the receiving spaces in cooperation with the inner circumferential surface of the cam receiving part, and partitioning parts which are brought into contact with the inner circumferential surface of the cam receiving part to partition the receiving spaces from one another; the locking means has a plurality of rollers received in each receiving space, and elastic means interposed between the rollers to press the rollers toward both ends of the receiving space; and the control plate has control projections which are interposed between the rollers of the locking means and the partition parts of the brake cam so as to push the rollers toward center portions of the receiving spaces when the control plate is rotated.

According to a still further aspect of the present invention, the pumping device further comprises a ring-shaped cam receiver which is accommodated in the cam receiving part of the support plate; and the brake cam is received in the cam receiver and has a plurality of receiving spaces between the brake cam and the inner circumferential surface of the cam receiver.

Further, in order to achieve the above object, the present invention provides a height adjuster for a vehicle seat comprising the pumping device as described above.

Advantageous Effects

Thanks to the above features of the present invention, the pumping device and the height adjuster for a vehicle seat having the same provide advantages in that, since the conventional knob-operated structure is changed to a lever-operated structure, when mounting the pumping device to the vehicle seat, the space that is defined for operation of the pumping device can be minimized, and the pumping device can be easily manipulated with reduced force. Also, increased braking force can be obtained due to the presence of locking means and a brake cam.

BRIEF DESCRIPTION OF THE DRAWINGS

The above objects, and other features and advantages of the present invention will become more apparent after a reading of the following detailed description taken in conjunction with the drawings, in which.

BEST MODE FOR CARRYING OUT THE INVENTION

Reference will now be made in greater detail to a preferred embodiment of the invention, an example of which is illustrated in the accompanying drawings.

<First Embodiment>

Figure 1:
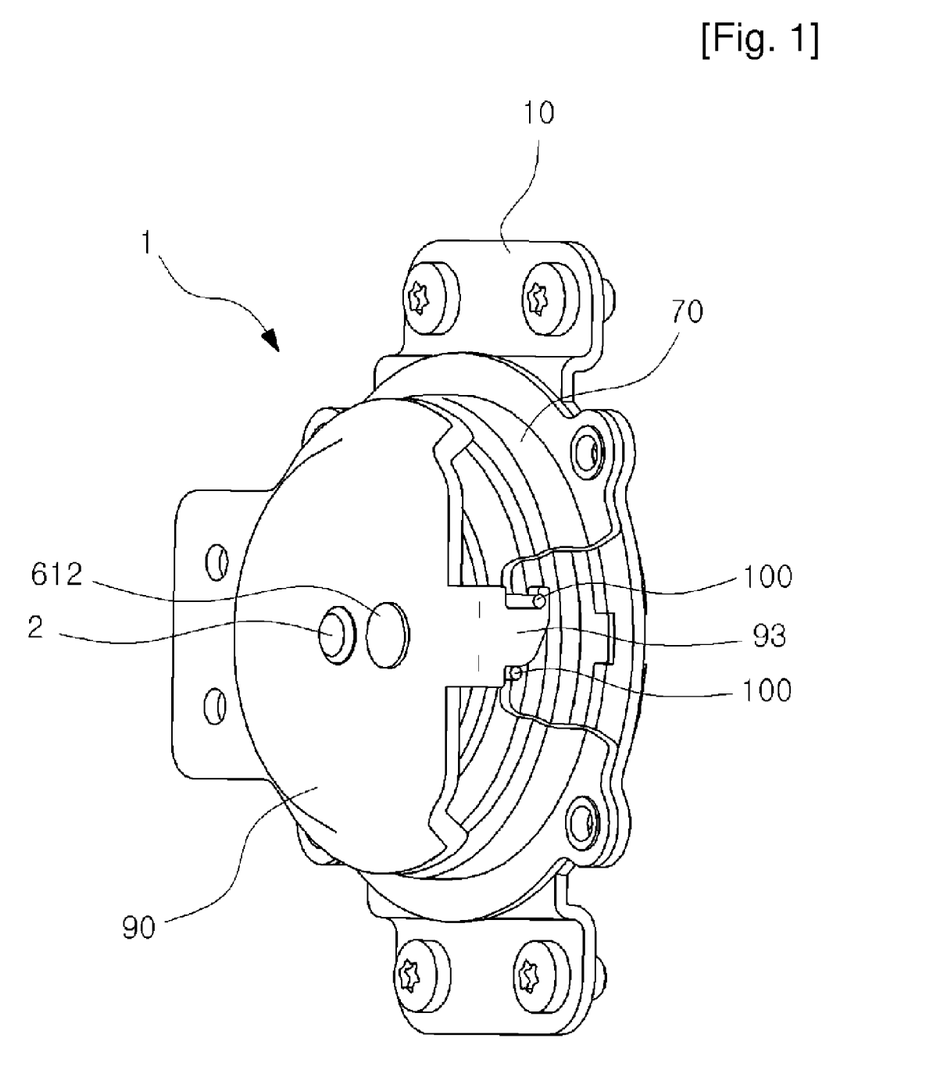
FIG. 1 is an assembled perspective view illustrating a pumping device in accordance with a first embodiment of the present invention.
Figure 2:
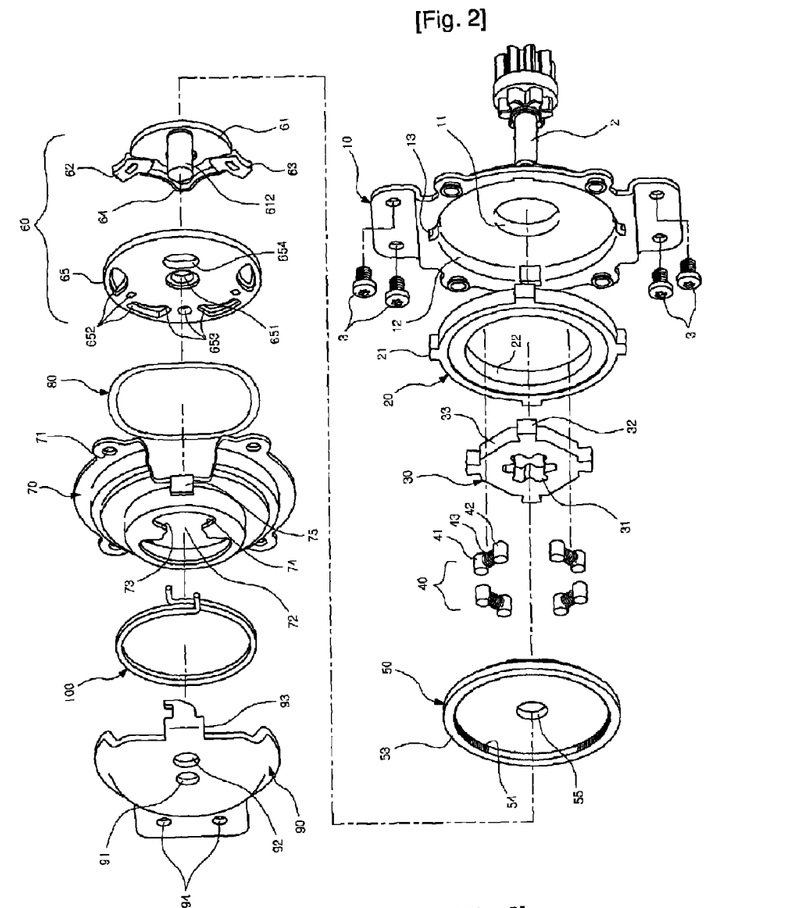
FIG. 2 is an exploded perspective view of the pumping device shown in FIG. 1.

Referring to FIGS. 1 and 2, in a pumping device 1 in accordance with a first embodiment of the present invention, a support plate 10, which is joined to a seat frame (not shown), and a cover plate 70 are locked to each other by bolts 3. A cam receiver 20, a brake cam 30, locking means 40, a control plate 50, a bidirectional clutch 60, and a thin plate spring 80 are sequentially received in the space defined between the support plate 10 and the cover plate 70, and a shaft 2 passes through these component elements. A lever plate 90, which has a lever (not shown) locked thereto or integrally extending therefrom, and a return spring 100 are positioned outside the cover plate 70.

The support plate 10 is defined with a hole 11 through which the shaft 2 passes, and is formed with an accommodating part 12 which accommodates and supports the cam receiver 20.

The cam receiver 20 is formed in the shape of a ring which has a predetermined thickness. In order to prevent the cam receiver 20 from being rotated when it is accommodated in the accommodating part 12 of the support plate 10, a plurality of protuberances 21 is formed on the circumferential outer surface of the cam receiver 20 to be inserted into the grooves 13 defined in the support plate 10. Also, the cam receiver 20 has an inner circumferential surface 22 able to rotatably receive the brake cam 30.

The brake cam 30 is received in the cam receiver 20, and is defined with a shaft coupling hole 31, in which the shaft 2 is coupled, so that the brake cam 30 can be integrally rotated with the shaft 2. A plurality of partitioning parts 32 projects from the outer surface of the brake cam 30 to be spaced apart from one another at regular intervals in the circumferential direction. The partitioning parts 32 are brought into contact with the inner circumferential surface 22 of the cam receiver 20 to support the brake cam 30 so that the brake cam 30 can execute sliding rotation with respect to the cam receiver 20. The brake cam 30 has linear surface parts 33 between the partitioning parts 32, so that receiving spaces 'S' (see FIG. 3) are defined between the linear surface parts 33 of the brake cam 30 and the inner circumferential surface 22 of the cam receiver 20. Due to this fact, the radial width of each receiving space 'S' gradually increases toward the center portion of the receiving space 'S' and gradually decreases toward both ends of the receiving space 'S'.

Figure 3:
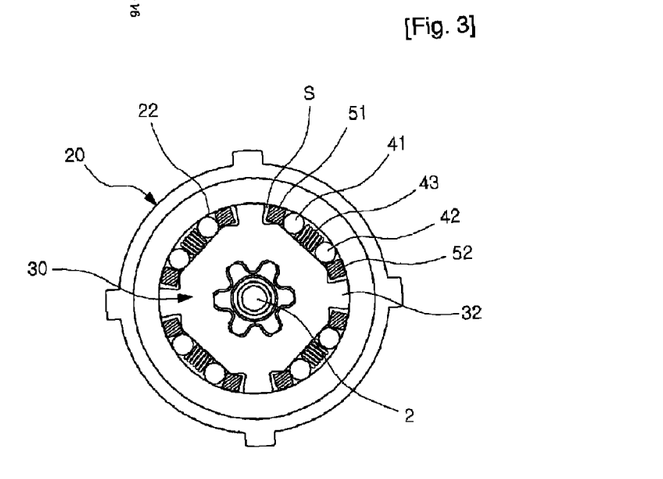
FIG. 3 is a plan view illustrating the state in which locking means, a brake cam and a cam receiver of FIG. 2 are assembled with one another.

The partitioning parts 32 serve as partition walls between two adjoining receiving spaces 'S'. The plurality of receiving spaces 'S' are defined between the inner circumferential surface 22 of the cam receiver 20 and the linear surface parts 33 of the brake cam 30 to be spaced apart at regular intervals from one another in the circumferential direction.

The locking means 40 are respectively received in the receiving spaces 'S' defined between the cam receiver 20 and the brake cam 30 to unlock and lock the brake cam 30 from and to the cam receiver 20 depending upon whether or not pushing force is applied to the locking means 40 in the circumferential direction. In the present embodiment, each locking means 40 comprises a pair of rollers 41 and 42 which is received in each receiving space 'S' and a spring 43 which is interposed between the rollers 41 and 42.

Referring to FIG. 3, the rollers 41 and 42 are pressed by the spring 43 toward both ends of the receiving space 'S' and are simultaneously brought into tight contact with the inner circumferential surface 22 of the cam receiver 20 and the linear surface parts 33 of the brake cam 30. The brake cam 30, which is received in the cam receiver 20, is prevented from being rotated clockwise by the first rollers 41 positioned at first ends of the respective receiving spaces 'S' and from being rotated counterclockwise by the second rollers 42 positioned at second ends of the respective receiving spaces 'S'. Therefore, when external force is not applied to the rollers 41 or 42 in the circumferential direction, the brake cam 30 is held in a locked state.

It is to be readily understood that the rollers 41 and 42 can be replaced with balls (not shown). Also, the spring 43 may comprise a coil spring or other elastic means, such as a V-shaped spring, an elastic member made of rubber, and the like.

The control plate 50 (see FIG. 2) functions to apply and remove pushing force to and from the locking means 40 in the circumferential direction through rotation thereof, and to thereby control the operation of the locking means 40. To this end, as shown in FIG. 3, control projections 51 and 52 are formed on one surface of the control plate 50 and are inserted into both ends of the respective receiving spaces 'S'.

A pair of control projections 51 and 52 is provided in each receiving space 'S' such that the pair of control projections 51 and 52 is brought into contact with and supports the pair of rollers 41 and 42, which are pressed by the spring 43.

As a consequence, when the control plate 50 is rotated clockwise, first control projections 51, which are brought into contact with the first rollers 41, push the first rollers 41 toward the center portions of the receiving spaces 'S', and the brake cam 30 is unlocked from the cam receiver 20. As the partitioning parts 32 are pushed by second control projections 52, the brake cam 30 is rotated. At this time, because the second rollers 42, which are positioned in the respective receiving spaces 'S', do not generate resistant force which acts against the rotation of the brake cam 30, the brake cam 30 can smoothly rotate clockwise. On the other hand, when the control plate 50 is rotated counterclockwise, the second rollers 42 are pushed by the second control projections 52, and the brake cam 30 rotates counterclockwise.

Referring to FIG. 2, a rim part 53 having a predetermined thickness is formed on the periphery of the other surface of the control plate 50 which faces away from the one surface having the control projections 51 and 52 formed thereon. A plurality of teeth 54 is formed on the inner circumferential surface of the rim part 53. A clutch cam 61 and locking gears 62 and 63, which will be described later in detail, are accommodated in the rim part 53.

A hole 55 is defined through the center portion of the control plate 50 such that the shaft 2 can pass through the hole 55.

The bidirectional clutch 60 includes the clutch cam 61, the locking gears 62 and 63, a spring 64, and a guide plate 65. The clutch cam 61 is defined with a hole 611 (see FIG. 4), through which the shaft 2 passes, and can rotate about the shaft 2 clockwise and counterclockwise. The locking gears 62 and 63 are arranged to be spaced apart from each other by a predetermined angle in the rotating direction of the clutch cam 61, and are selectively pushed through rotation of the clutch cam 61 to execute sliding movement. The spring 64 serves as elastic pressing means for returning the locking gears 62 and 63 to their original positions. In other words, the spring 64 functions to return either one of the locking gears 62 or 63 to its original position when the force of the clutch cam 61 for pushing the locking gear 62 or 63 is removed.

A hole 651 is defined through the center portion of the guide plate 65 such that the shaft 2 can pass through the hole 651. In particular, guiding parts 652 for guiding the sliding movement of the locking gears 62 and 63 and supporting parts 653 for supporting the spring 64 are formed on the guide plate 65 (see FIG. 4) so as to project.

The clutch cam 61 has a rotation column 612 at a position which is eccentric from the hole 611 through which the shaft 2 passes, and the guide plate 65 has defined therein a guide slot 654 through which the rotation column 612 passes so as to be limited in the rotation angle thereof. The guide slot 654 can perform, independently or along with stoppers 73 and 74, which will be described later, the function of limiting the rotation range of the clutch cam 61.

The rotation column 612 is fitted into a hole 92 defined in the lever plate 90 after passing through the guide slot 654 to be firmly connected to the lever plate 90. Accordingly, the clutch cam 61 can be rotated in both rotating directions through rotation of the lever plate 90.

Figure 4:
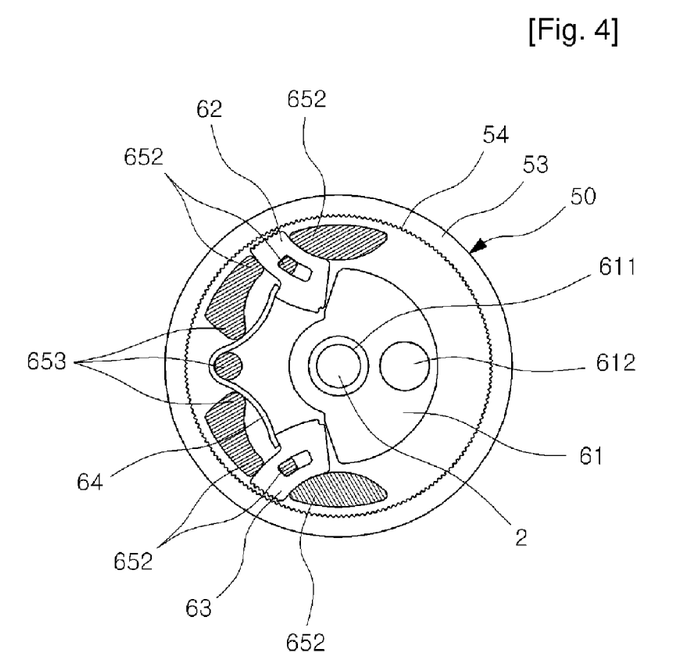
FIGS. 4 and 5 are plan views explaining the assembly and operation of a bidirectional clutch shown in FIG. 2.
Figure 5:
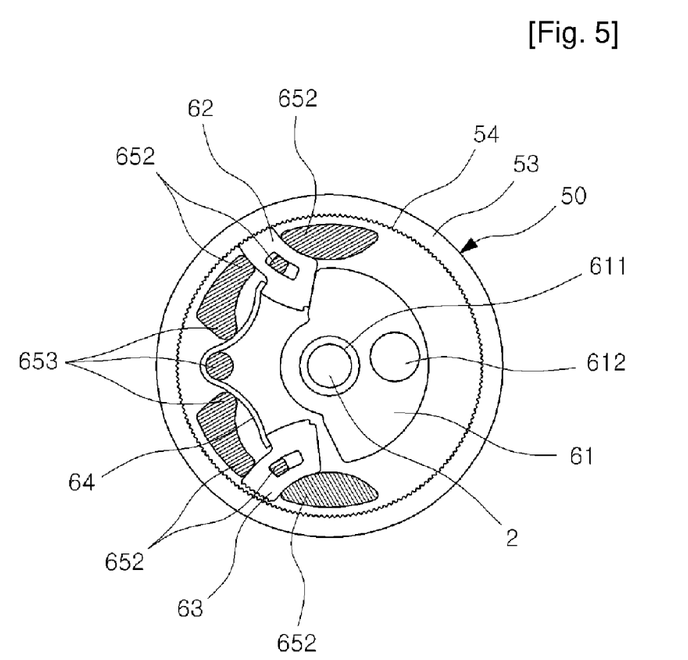

FIGS. 4 and 5 are plan views illustrating the assembled state of the bidirectional clutch 60 and the control plate 50, which are configured as described above. The locking gears 62 and 63 are guided by the guiding parts 652 such that they can slide between a decoupled position (see FIG. 4), in which they are decoupled from the teeth 54 of the rim part 53, and a coupled position (see FIG. 5), in which either one of them is coupled to the teeth 54 of the rim part 53.

FIG. 4 illustrates a state in which rotating force is not applied to the clutch cam 61. In this state, the locking gears 62 and 63 are held in the decoupled position, in which they are decoupled from the teeth 54 of the control plate 50, by the pressing force of the spring 64 which is supported by the supporting parts 653.

FIG. 5 illustrates the state in which rotating force is applied to the clutch cam 61. In this state, as the rotating force is applied to the rotation column 612 through the lever plate 90, the clutch cam 61 is rotated about the shaft 2 such that the locking gear 62 placed adjacent to one end of the clutch cam 61 can be slidingly pushed to the coupled position, in which it is coupled to the teeth 54 of the control plate 50.

As a consequence, thanks to the construction as described above, when the rotating force is applied to the bidirectional clutch 60 through the rotation column 612 in one direction or the opposite direction, the bidirectional clutch 60 is coupled to the control plate 50. Further, when the rotating force applied to the bidirectional clutch 60 is removed, the bidirectional clutch 60 is returned to its original position, in which it is decoupled from the control plate 50.

Referring to FIG. 2, the cover plate 70 is defined with a plurality of locking holes 71 and is locked to the support plate 10 by the bolts 3 which pass through the locking holes 71, such that the cam receiver 20, the brake cam 30, the locking means 40, the control plate 50, and the bidirectional clutch 60 are received in the space defined between the support plate 10 and the cover plate 70. The thin plate spring 80 can be disposed inside the cover plate 70 to supplement force for supporting the component elements.

The lever plate 90 is placed outside the cover plate 70, and is defined with a hole 91 through which the shaft 2, projecting through the opening 72 defined in the cover plate 70, passes. The lever plate 90 has the hole 92 into which the rotation column 612 of the clutch cam 61, also projecting through the opening 72 of the cover plate 70, is fitted to be firmly connected to the lever plate 90. Therefore, the lever plate 90 can rotate about the shaft 2. When the lever plate 90 is rotated, the rotation column 612, which is fitted into the hole 92, is also rotated to operate the clutch cam 61.

A projection 93 is formed on one side of the lever plate 90, and the return spring 100, which serves as elastic returning means for elastically returning the rotated lever plate 90, is arranged between the lever plate 90 and the cover plate 70. The projection 93 and the projection 75, formed on the cover plate 70, are fitted between both ends of the return spring 100. Thus, due to the fact that, when rotating force is applied to the lever plate 90, the lever plate 90 is always elastically pressed toward its original reference position, as shown in FIG. 1 by the return spring 100 which elastically supports the projection 93, if the rotating force is removed, the lever plate 90 is returned to its original reference position.

Meanwhile, referring to FIG. 2, in order to prevent the lever plate 90 from being rotated from the reference position by more than a predetermined angle in each rotating direction, the stoppers 73 and 74 are formed on the cover plate 70 to limit the rotation angle of the rotation column 612, which is integrally rotated with the lever plate 90.

In order to rotate the lever plate 90, a lever (not shown) can be locked to the lever plate 90 through locking holes 94 defined through the lever plate 90, or a portion of the lever plate 90 can be extended to form an integral lever.

Describing the operation of the pumping device 1 in accordance with the first embodiment of the present invention with reference to FIG. 2, first, as the lever plate 90 coupled to the lever is rotated through manual manipulation of the lever, the clutch cam 61, which has the rotation column 612 fitted into the hole 92 of the lever plate 90, is integrally rotated with the lever plate 90. According to this, the locking gear 62 is slid and is meshed with the teeth 54 of the control plate 50, by which the control plate 50 starts to rotate (see FIG. 5). With the rotation of the control plate 50, as shown in FIG. 3, the control projections 52 formed on one surface of the control plate 50 push the rollers 42 in the circumferential direction. In succession, the brake cam 30 and the cam receiver 20 are freed from a locked state, that is, unlocked from each other, by which the brake cam 30 is rotated. By the rotation of the brake cam 30, the shaft 2 is integrally rotated with the brake cam 30.

After the rotation column 612 is integrally rotated with the lever plate 90 and engages with one stopper 73, to be prevented from being further rotated, if the rotating force applied to the lever plate 90 is removed, the pushing by the control projections 52 (see FIG. 3) is ceased, and the pressing force of the springs 43 is applied to the rollers 42. Then, the brake cam 30 and the cam receiver 20 are locked again to each other, by which the shaft 2 is stopped from moving and the rotated position of the shaft 2 is fixed (see FIG. 3). The lever plate 90 is returned to its original reference position by the return spring 100, and the clutch cam 61 is rotated in the reverse direction. Thereupon, the locking gear 62 is slidingly moved to the decoupled position (see FIG. 4) by the spring 64, and the coupled state between the bidirectional clutch 60 and the control plate 50 is also released (see FIGS. 4 and 5).

<Second Embodiment>

Figure 6:
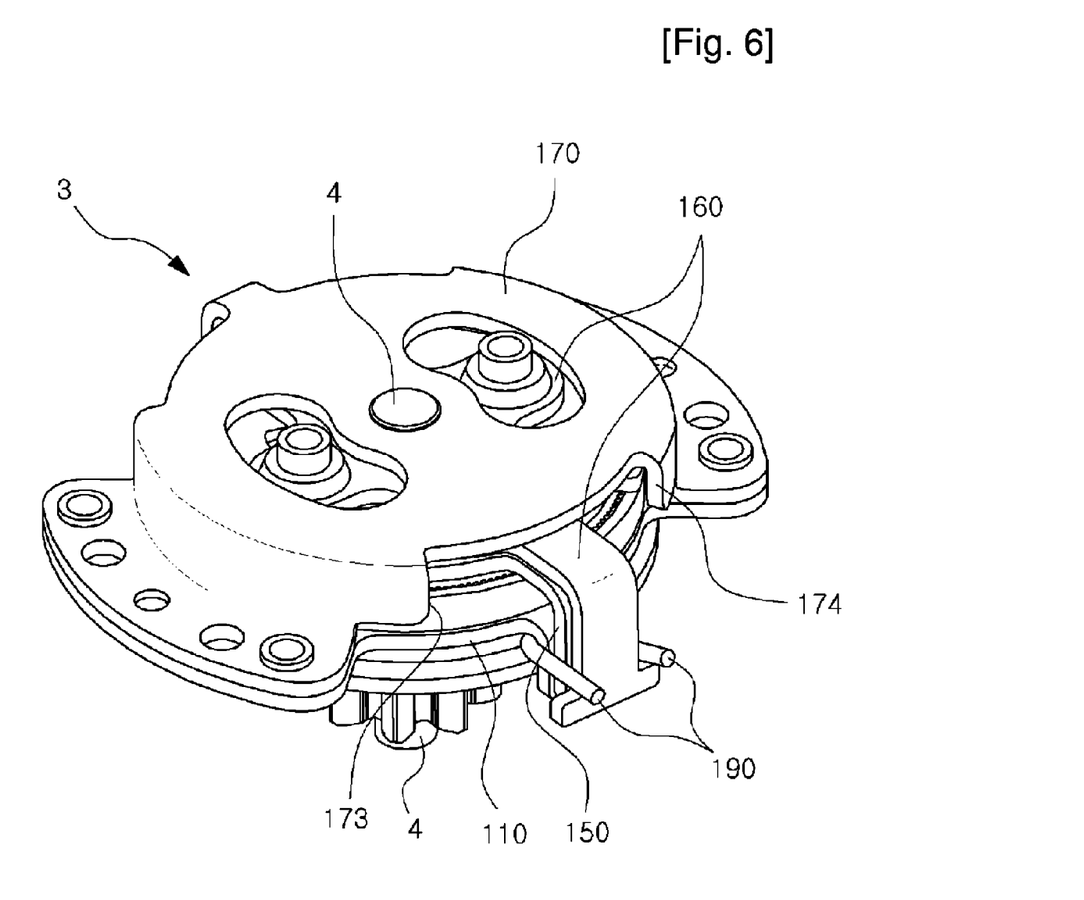
FIG. 6 is an assembled perspective view illustrating a pumping device in accordance with a second embodiment of the present invention.
Figure 7:
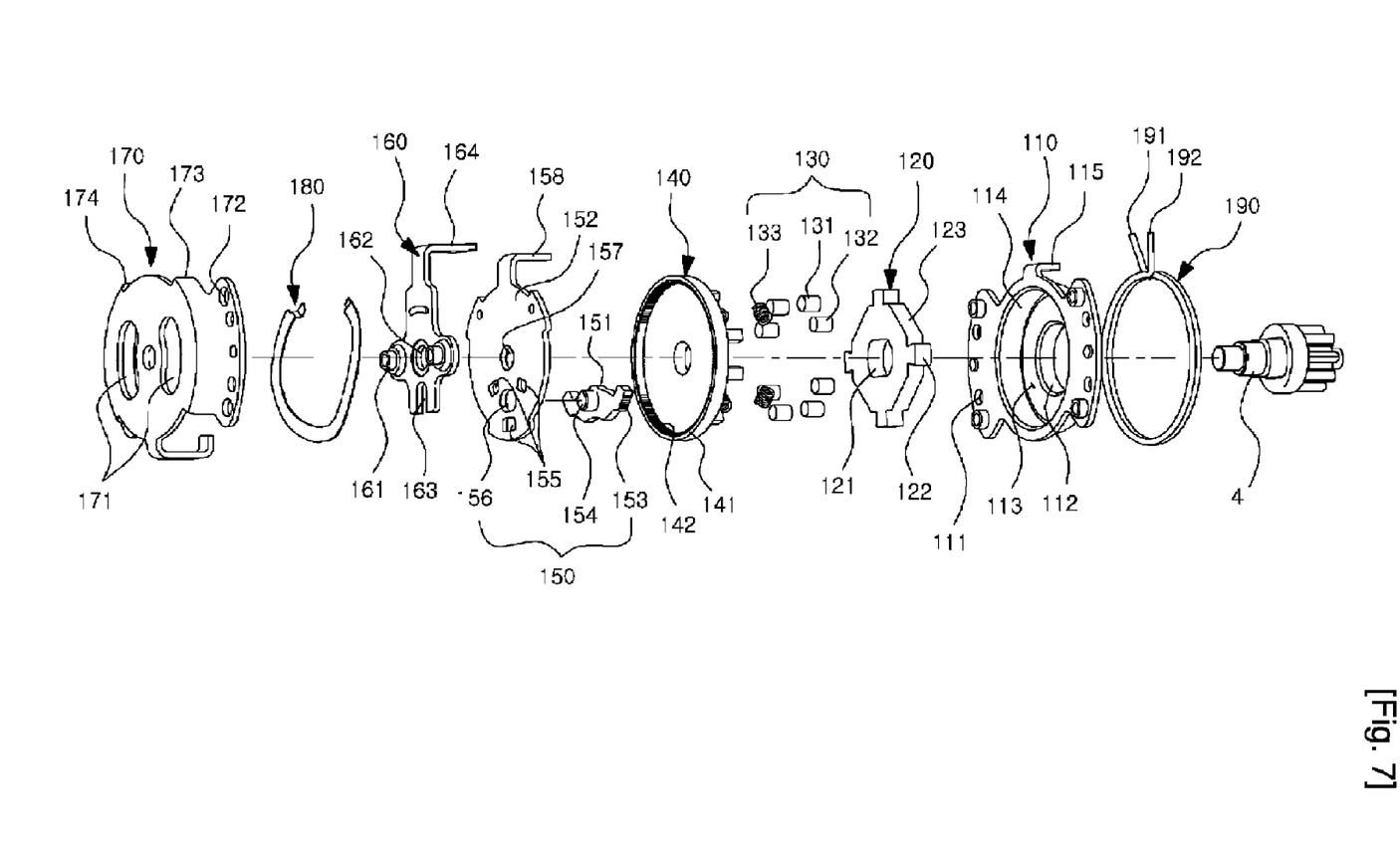
FIG. 7 is an exploded perspective view of the pumping device shown in FIG. 6.

Referring to FIGS. 6 and 7, in a pumping device 3 in accordance with a second embodiment of the present invention, a support plate 110, which is joined to a seat frame (not shown), and a cover plate 170 are locked to each other by bolts which are inserted through bolt locking holes 111. A brake cam 120, locking means 130, a control plate 140, a bidirectional clutch 150, a hinge lever 160, and a wave washer 180 are sequentially received in the space defined between the support plate 110 and the cover plate 170, and a shaft 4 passes through these component elements. A lever (not shown), which is locked to the left and right lockers 161 of the hinge lever 160 through openings 171, is positioned outside the cover plate 170.

The support plate 110 is defined with a hole 112 through which the shaft 4 passes, and delimits a cam receiving part 113 for receiving the brake cam 120.

The cam receiving part 113 has a ring-shaped space, and the support plate 110 has an inner circumferential surface 114 which faces the cam receiving part 113 and has a predetermined width.

The brake cam 120 is received in the cam receiving part 113 of the support plate 110, and is defined with a shaft coupling hole 121 in which the shaft 4 is coupled so that the brake cam 120 can be integrally rotated with the shaft 4. A plurality of partitioning parts 122 projects from the outer surface of the brake cam 120 to be spaced apart from one another at regular intervals in the circumferential direction. The partitioning parts 122 are brought into contact with the inner circumferential surface 114 of the support plate 110 to support the brake cam 120 so that the brake cam 120 can execute sliding rotation with respect to the support plate 110. The brake cam 120 has linear surface parts 123 between the partitioning parts 122 so that, similar to the first embodiment (see the receiving spaces 'S' of FIG. 3), receiving spaces are defined between the linear surface parts 123 of the brake cam 120 and the inner circumferential surface 114 of the support plate 110. Due to this fact, similar to the first embodiment, the radial width of each receiving space gradually increases toward the center portion of the receiving space, and gradually decreases toward both ends of the receiving space.

Similar to the first embodiment, the partitioning parts 122 serve as partition walls between two adjoining receiving spaces. The plurality of receiving spaces are defined between the inner circumferential surface 114 of the support plate 110 and the linear surface parts 123 of the brake cam 120 to be spaced apart at regular intervals from one another in the circumferential direction.

The locking means 130 are received in respective receiving spaces defined between the support plate 110 and the brake cam 120 to unlock and lock the brake cam 120 from and to the support plate 110 depending upon whether or not pushing force is applied to the locking means 130 in the circumferential direction. In the present embodiment, each locking means 130 comprises a pair of rollers 131 and 132 which is received in each receiving space and a spring 133 which is interposed between the rollers 131 and 132.

Since the operation of the brake cam 120 associated with the locking means 130 is the same as that of the first embodiment, a detailed description thereof will be omitted herein. In the present embodiment, unlike the first embodiment, the pumping device 3 does not include the cam receiver (see 20 in FIG. 2), and therefore, the brake cam 120 is directly locked to and unlocked from the support plate 110 through the locking means 130.

However, even in this embodiment, as in the case of the first embodiment, the cam receiver (see 20 in FIG. 2) may be accommodated in the cam receiving part 113 of the support plate 110, and the brake cam 120 may be received in the cam receiver to define the receiving spaces between the brake cam 120 and the inner circumferential surface of the cam receiver.

The control plate 140 functions to apply and remove pushing force to and from the locking means 130 in the circumferential direction through rotation thereof and to thereby control the operation of the locking means 130.

Because the structure and the operation pattern of the control plate 140 are the same as those of the first embodiment, the detailed description thereof will be omitted herein.

The bidirectional clutch 150 includes a locking gear 151 and a guide plate 152. The locking gear 151 is formed with teeth 153 on opposite surfaces thereof so that the locking gear 151 can be meshed with the teeth 142 which are formed on the inner circumferential surface of the rim part 141 of the control plate 140. A plurality of guide projections 155 is projectedly formed on the guide plate 152 to guide the locking gear 151 in a manner such that the locking gear 151 can slide along predetermined paths defined by the guide projections 155.

The locking gear 151 is formed with a sliding projection 154 which projects toward the guide plate 152. In correspondence with this, the guide plate 152 is defined with a guide slot 156 through which the sliding projection 154 is inserted. The guide slot 156 functions to limit the range in which the locking gear 151 slides on the guide plate 152.

A hole 157 is defined through the center portion of the guide plate 152 such that the shaft 4 can pass through the hole 157.

Referring to FIG. 7, the hinge lever 160 is provided to the left side of the bidirectional clutch 150. A hole 162 is defined through the center portion of the hinge lever 160 such that the shaft 4 can pass through the hole 162. The hinge lever 160 can rotate about the shaft 4 in both directions, that is, clockwise and counterclockwise. A projection guide part 163 is formed at the lower end of the hinge lever 160 such that the sliding projection 154 projecting through the guide slot 156 is inserted through the projection guide part 163 to be guided therealong.

If the hinge lever 160 is rotated about the shaft 4, which passes through the hole 162 in one direction, the sliding projection 154, inserted through the projection guide part 163, slides leftward or rightward. Thus, as the locking gear 151 is slidingly moved in the leftward or rightward direction, some of the teeth 153 are meshed with the teeth 142 of the control plate 140 (see FIGS. 8 through 10).

Due to the fact that the projection guide part 163 is defined with a slot which extends in a radial direction (in the drawing, the lower end of the slot is opened), when the hinge lever 160 is rotated, the sliding projection 154 is prevented from moving in the circumferential direction and is allowed to move in the radial direction. That is to say, the sliding projection 154 of the locking gear 151, which slidingly moves in the leftward and rightward directions, can radially slide in the projection guide part 163.

In FIG. 7, engagement arms 164, 158 and 115 are respectively formed at the upper ends of the hinge lever 160, the guide plate 152 and the support plate 110 such that they are bent and overlap with one another when the hinge lever 160, the guide plate 152 and the support plate 110 are assembled with one another. The engagement arms 164, 158 and 115 are positioned between both ends 191 and 192 of a return spring 190 which is placed at the right side of the support plate 110. The elastic force of the return spring 190 is applied between the engagement arm 164 of the hinge lever 160 and the engagement arm 115 of the support plate 110. As will be described later in detail, the engagement arm 158 of the guide plate 152 is rotated along with the engagement arm 164 of the hinge lever 160.

Figure 8:
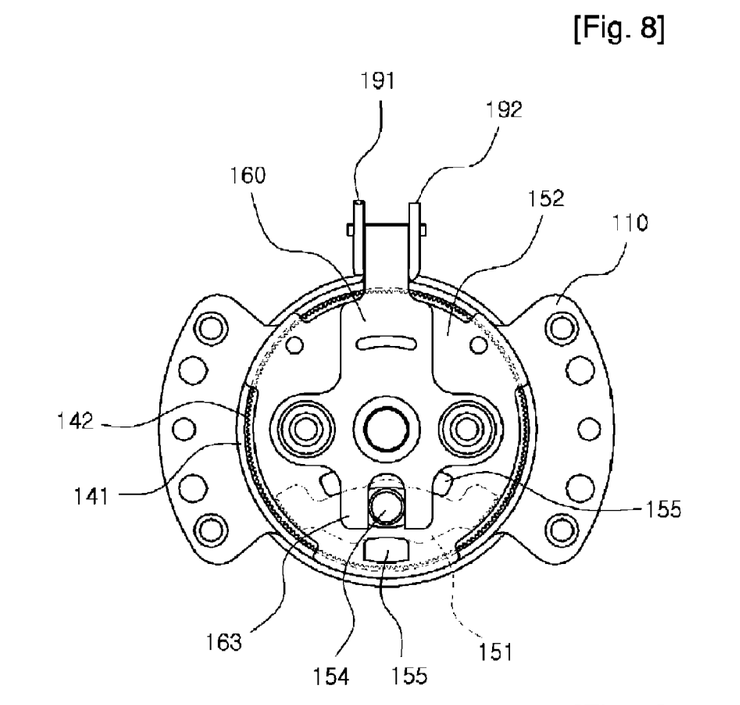
FIGS. 8 through 10 are plan views explaining the assembly and operation of the hinge lever and the bidirectional clutch shown in FIG. 6.
Figure 9:
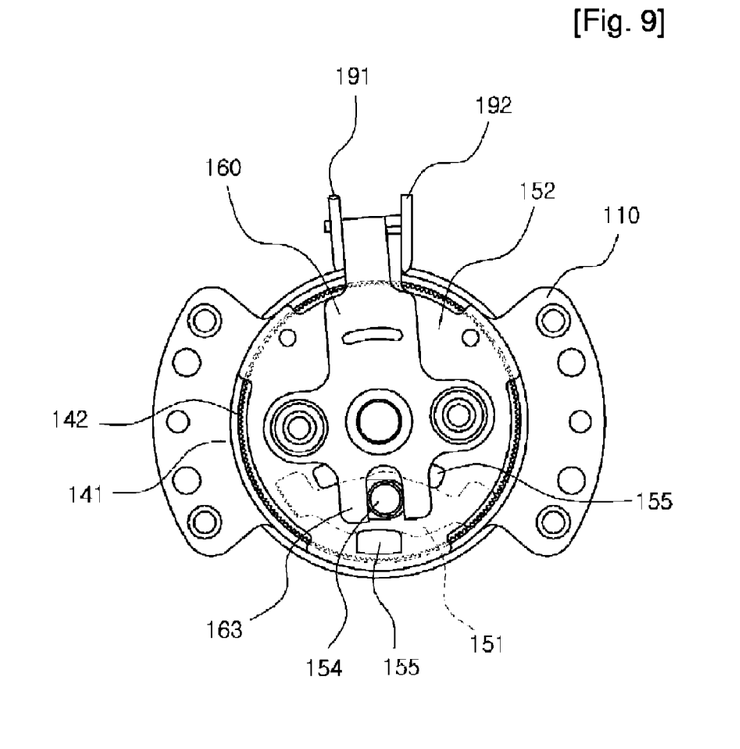
Figure 10:
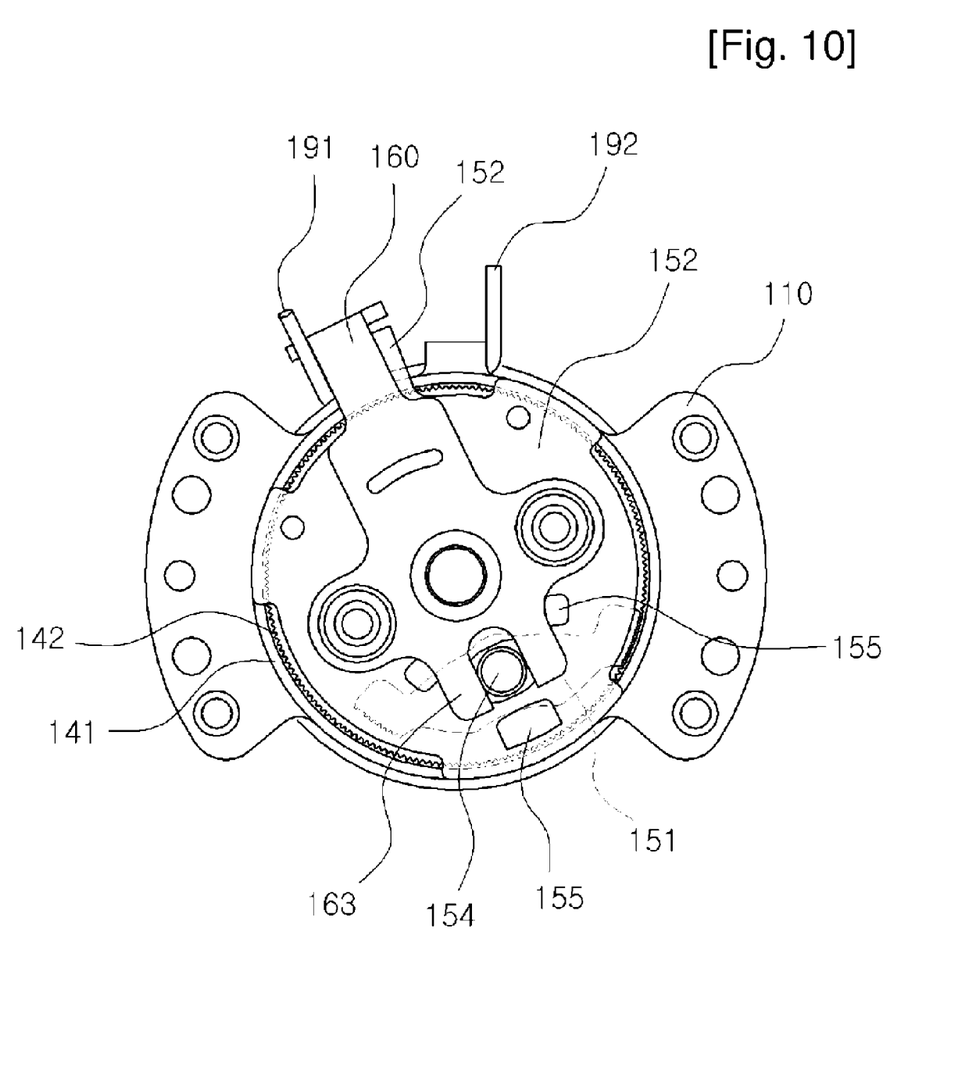

FIGS. 8 through 10 are plan views explaining the operation of the control plate 140, the bidirectional clutch 150 and the hinge lever 160. The locking gear 151 is moved by the rotation of the hinge lever 160. While being guided by the guide projections 155, the locking gear 151 can slide between a decoupled position (see FIG. 8), in which it is decoupled from the teeth 142 of the rim part 141 of the control plate 140, and a coupled position (see FIG. 9), in which it is coupled to the teeth 142 of the rim part 141 of the control plate 140.

FIG. 8 illustrates the state in which rotating force is not applied to the hinge lever 160. In this state, the hinge lever 160 is held at a neutral position, in which equal pressing force is applied to the engagement arm 164 of the hinge lever 160 from both ends 191 and 192 of the return spring 190. Due to this fact, the locking gear 151 is held in the decoupled position, in which it is decoupled from the teeth 142 of the rim part 141 of the control plate 140.

FIG. 9 illustrates the state in which rotating force is applied to the hinge lever 160. In this state, as the hinge lever 160 is rotated, the projection guide part 163 applies pushing force to one side of the sliding projection 154 in one direction (rightward in the drawing). According to this, the locking gear 151 slides rightward on the guide plate 152 while being guided by the guide projections 155 to the coupled position, in which it is coupled to the teeth 142 of the rim part 141 of the control plate 140.

With the locking gear 151 held at the coupled position, as rotating force is continuously applied to the hinge lever 160, as shown in FIG. 10, the locking gear 151 and the control plate 140, meshed therewith, are rotated together. At this time, the guide plate 152 is rotated along with the hinge lever 160 in the state in which the guide plate 152 is spaced apart from the hinge lever 160 by a predetermined angle.

Meanwhile, in FIG. 10, after the rotation of the hinge lever 160 is completed, if the rotating force applied to the hinge lever 160 is removed, the hinge lever 160 starts to rotate clockwise due to the pressing force from both ends 191 and 192 of the return spring 190. At this time, the locking gear 151 slides leftward and returns to the decoupled position. The guide plate 152 is not rotated until the locking gear 151 returns to the decoupled position.

After the sliding return of the locking gear 151 is completed, the hinge lever 160 is rotated along with the guide plate 152 to the original neutral position, as shown in FIG. 8, under the application of pressing force from both ends 191 and 192 of the return spring 190.

Therefore, through the operational procedure shown in FIGS. 8 through 10, the control plate 140, the brake cam 120, and the shaft 4 coupled to the brake cam 120 are rotated.

Although the hinge lever 160 has been described with reference to FIGS. 8 through 10 as being rotated counterclockwise, it is to be readily understood that the hinge lever 160 can be rotated clockwise according to the same principle.

Due to the construction and the operation pattern of the bidirectional clutch 150 given above, the bidirectional clutch 150 is held at the coupled position, in which it is coupled to the control plate 140, when rotation force is input thereto through the hinge lever 160 in one direction or the other, and returns to the decoupled position, in which it is decoupled from the control plate 140, when rotation force applied to the hinge lever 160 is removed.

As shown in FIG. 7, the cover plate 170 is defined with a plurality of locking holes 172, and is locked to the support plate 110 by bolts which pass through the locking holes 172, such that the brake cam 120, the locking means 130, the control plate 140, the bidirectional clutch 150, and the hinge lever 160 are received in the space defined between the support plate 110 and the cover plate 170. The wave washer 180 can be disposed inside the cover plate 170 to supplement the force for supporting the component elements.

The cover plate 170 is defined with a pair of openings 171 such that both lockers 161 of the hinge lever 160 can be exposed to the outside through the openings 171. The lockers 161 are locked to the external lever (not shown) so that rotating force can be input to the hinge lever 160 from the external lever through the lockers 161.

Referring to FIGS. 6 and 7, in order to prevent the hinge lever 160 from being rotated from the neutral position by more than a predetermined angle in each rotating direction, stoppers 173 and 174 are formed on the cover plate 170.

Describing the operation of the pumping device 3 in accordance with the second embodiment of the present invention with reference to FIG. 7, first, as the hinge lever 160, coupled to the lever, is rotated through manual manipulation of the lever, the locking gear 151 slides via the projection guide part 163. According to this, some of the teeth 153 of the locking gear 151 are meshed with the teeth 142 of the rim part 141 of the control plate 140 (see FIG. 9), and then, the control plate 140 is rotated (see FIG. 10). With the rotation of the control plate 140, the brake cam 120 and the support plate 110 are freed from a locked state, that is, unlocked from each other, and therefore the brake cam 120 rotates. Due to the rotation of the brake cam 120, the shaft 4 is integrally rotated with the brake cam 120.

After the hinge lever 160 is engaged with one stopper 174 to be prevented from being further rotated, if the rotating force applied to the hinge lever 160 is removed, the pushed state of the locking means 130 by the control plate 140 is released, and the brake cam 120 and the support plate 110 are locked again to each other, by which the rotated position of the shaft 4 is fixed. In the initial stage of returning rotation of the hinge lever 160 by the return spring 190, the locking gear 151 slides to return to the decoupled position and thus be decoupled from the control plate 140. Thereafter, the hinge lever 160 returns to the original neutral position (see FIG. 8).

Through the operation of the pumping device 1 or 3, in accordance with the first or second embodiment of the present invention, depending upon the device connected to the shaft 2 or 4, as mentioned in the introductory part of the present specification, the height of a seat or the rotation amount of a seat back can be adjusted. For example, the pumping device 1 or 3 can be applied to Korean Patent Application No. 2005-0021020, filed on Mar. 14, 2005 in the name of the present applicant, and entitled "Height Adjuster for Vehicle Seat."

Specifically, because the second embodiment of the present invention has a decreased number of parts compared to the first embodiment, it can contribute to the improvement of productivity, the increase in the precision of a product, and the reduction in weight of the product. Therefore, it is deemed that the second embodiment achieves improvements over the first embodiment.

The invention claimed is:

1. A pumping device for controlling rotation and locking of a shaft, comprising:
a support plate having a hole through which the shaft passes;
a ring-shaped cam receiver accommodated in the support plate to be supported;
a brake cam received in the cam receiver to be integrally rotated with the shaft, and defining a plurality of receiving spaces between the brake cam and an inner circumferential surface of the cam receiver at regular intervals in a circumferential direction;
locking means received in each receiving space to allow and prevent rotation of the brake cam in the cam receiver depending upon whether or not pushing force is applied to the locking means in the circumferential direction;
a control plate for applying the pushing force to the locking means in the circumferential direction through rotation thereof;
a bidirectional clutch held in a state of being coupled to the control plate if clockwise or counterclockwise rotating force is applied thereto, and returned to a state of being decoupled from the control plate if the rotating force is not applied thereto;
a cover plate assembled with the support plate so that the cam receiver, the brake cam, the locking means, the control plate, and the bidirectional clutch are received in a space defined between the support plate and the cover plate;
a lever plate provided outside the cover plate, having a hole through which the shaft passes, and applying the clockwise or counterclockwise rotating force to the bidirectional clutch; and
elastic returning means for returning the lever plate to a predetermined reference position,
wherein the bidirectional clutch includes a clutch cam which rotates about the shaft upon application of the rotating force from the lever plate, a locking gear slid by the rotating clutch cam from a decoupled position, in which the locking gear is decoupled from the control plate, to a coupled position, in which the locking gear is coupled to the control plate, and elastic pressing means for pressing the locking gear toward the decoupled position; and
the control plate is formed with teeth to be coupled with the locking gear, and
wherein the bidirectional clutch further includes a guide plate which has a guiding part for guiding sliding movement of the locking gear and a supporting part for supporting the elastic pressing means.

2. The pumping device according to claim 1, wherein the locking gear is provided in a plural number to be selectively slid depending upon a rotating direction of the clutch cam.

3. The pumping device according to claim 1, wherein the clutch cam further includes a rotation column which projects from the clutch cam and has one end coupled to the lever plate to receive the rotating force from the lever plate; and
   wherein the guide plate has a guide slot through which the rotation column passes to be limited in a rotation angle thereof.

4. The pumping device according to claim 1, wherein the clutch cam further includes a rotation column which projects from the clutch cam and has one end coupled to the lever plate to receive the rotating force from the lever plate; and
   the cover plate has a plurality of stoppers which limit a rotation angle of the rotation column so as to prevent the lever plate from being rotated beyond a predetermined angle from the reference position in each rotating direction thereof.

5. The pumping device according to claim 1, wherein the brake cam has linear surface parts which define the receiving spaces in cooperation with the inner circumferential surface of the cam receiver, and partitioning parts which are brought into contact with the inner circumferential surface of the cam receiver to partition the receiving spaces from one another;
   the locking means includes a plurality of rollers received in each receiving space, and elastic means interposed between the rollers to press the rollers toward both ends of the receiving space; and
   the control plate has control projections which are interposed between the rollers of the locking means and the partition parts of the brake cam so as to push the rollers toward center portions of the receiving spaces if the control plate is rotated.

6. A height adjuster for a vehicle seat comprising the pumping device according to claim 1.

7. The pumping device according to claim 1, wherein the bidirectional clutch further includes a guide plate which has a guiding part for guiding sliding movement of the locking gear and a supporting part for supporting the elastic pressing means.

8. A pumping device for controlling rotation and locking of a shaft, comprising:
   a support plate having a hole for passage of the shaft and a ring-shaped cam receiving part formed around the hole;
   a brake cam received in the cam receiving part of the support plate to be integrally rotated with the shaft, and having a plurality of receiving spaces between the brake cam and an inner circumferential surface of the cam receiving part at regular intervals in a circumferential direction;
   locking means received in each receiving space to allow and prevent rotation of the brake cam in the cam receiving part depending upon whether or not pushing force is applied to the locking means in the circumferential direction;
   a control plate for applying the pushing force to the locking means in the circumferential direction through rotation thereof;
   a bidirectional clutch held in a state of being coupled to the control plate if clockwise or counterclockwise rotating force is applied thereto, and returned to a state of being decoupled from the control plate if the rotating force is not applied thereto;
   a hinge lever having a hole for passage of the shaft, and applying the rotating force to the bidirectional clutch while being rotated about the shaft;
   a cover plate assembled with the support plate so that the brake cam, the locking means, the control plate, the bidirectional clutch, and the hinge lever are received in a space defined between the support plate and the cover plate; and
   elastic returning means for returning the hinge lever to a predetermined reference position,
   wherein the bidirectional clutch includes a locking gear that slides between a coupled position, in which the locking gear is coupled to the control plate, and a decoupled position, in which the locking gear is decoupled from the control plate, depending upon whether or not the rotating force is applied from the hinge lever to the locking gear, and a guide plate rotatably coupled to the shaft to guide sliding movement of the locking gear; and the control plate is formed with teeth to be coupled with the locking gear.

9. The pumping device according to claim 8, wherein the locking gear has a plurality of teeth parts to be selectively coupled to the control plate depending upon a direction in which the rotating force is applied by the hinge lever.

10. The pumping device according to claim 9, wherein the locking gear has a sliding projection;
    the guide plate has a guide slot through which the sliding projection passes, so that a sliding range of the sliding projection can be limited by the guide slot; and the hinge lever has a projection guide part which controls the position of the sliding projection in the guide slot when the hinge lever is rotated.

11. The pumping device according to claim 8, wherein the locking gear has a sliding projection;
    the guide plate has a guide slot through which the sliding projection passes, so that a sliding range of the sliding projection can be limited by the guide slot; and the hinge lever has a projection guide part which controls the position of the sliding projection in the guide slot when the hinge lever is rotated.

12. The pumping device according to claim 8, wherein the cover plate has an opening for allowing the hinge lever to be directly rotated from the outside.

13. The pumping device according to claim 8, wherein the brake cam has linear surface parts which form the receiving spaces in cooperation with the inner circumferential surface of the cam receiving part, and partitioning parts which are brought into contact with the inner circumferential surface of the cam receiving part to partition the receiving spaces from one another;
    the locking means has a plurality of rollers received in each receiving space, and elastic means interposed between the rollers to press the rollers toward both ends of the receiving space; and
    the control plate has control projections which are interposed between the rollers of the locking means and the partition parts of the brake cam so as to push the rollers toward center portions of the receiving spaces when the control plate is rotated.

14. The pumping device according to claim 8, wherein the pumping device further comprises a ring-shaped cam receiver which is accommodated in the cam receiving part of the support plate; and
    the brake cam is received in the cam receiver and has a plurality of receiving spaces between the brake cam and an inner circumferential surface of the cam receiver.

15. A height adjuster for a vehicle seat comprising the pumping device according to claim 8.

* * * * *